(12) United States Patent
Cutler et al.

(10) Patent No.: US 6,812,927 B1
(45) Date of Patent: Nov. 2, 2004

(54) SYSTEM AND METHOD FOR AVOIDING DEPTH CLEARS USING A STENCIL BUFFER

(75) Inventors: Scott P. Cutler, San Jose, CA (US); Jonah M. Alben, San Jose, CA (US)

(73) Assignee: NVIDIA Corporation, Santa Clara, CA (US)

( * ) Notice: Subject to any disclaimer, the term of this patent is extended or adjusted under 35 U.S.C. 154(b) by 164 days.

(21) Appl. No.: 10/175,199

(22) Filed: Jun. 18, 2002

(51) Int. Cl.[7] .................................................. G06T 1/20
(52) U.S. Cl. ....................... 345/506; 345/422; 345/559; 345/545
(58) Field of Search ................................. 345/531, 545, 345/561, 501, 503, 559, 506, 422

(56) References Cited

U.S. PATENT DOCUMENTS 5,061,919 A  10/1991  Watkins .................... 340/721
5,805,868 A   9/1998  Murphy ..................... 395/502
6,337,690 B1 * 1/2002  Ashburn et al. ........... 345/531
6,348,919 B1 * 2/2002  Murphy ..................... 345/421
6,614,444 B1 * 9/2003  Duluk et al. ............... 345/581

* cited by examiner

Primary Examiner—Kee M. Tung
(74) Attorney, Agent, or Firm—Kevin J. Zilka; Zilka-Kotab, PC

(57) ABSTRACT

A system and method are provided for reducing the number of depth clear operations in a hardware graphics pipeline. Initially, a frame count is stored into a frame buffer associated with the hardware graphics pipeline. The stored frame count is associated with a pixel. A depth clear operation is then performed based at least in part on the frame count utilizing the hardware graphics pipeline.

29 Claims, 9 Drawing Sheets

SYSTEM AND METHOD FOR AVOIDING DEPTH CLEARS USING A STENCIL BUFFER

FIELD OF THE INVENTION

The present invention relates to computer graphics, and more particularly to performing depth clear operations in the context of a computer graphics pipeline.

BACKGROUND OF THE INVENTION

Prior Art FIG. 1A is a block diagram of a digital processing system embodying the method and apparatus, in accordance with one embodiment. With reference to Prior Art FIG. 1A, a computer graphics system is provided that may be implemented using a computer 100. The computer 100 includes one or more processors, such as processor 101, which is connected to a communication bus 102. The bus 102 can be implemented with one or more integrated circuits, and perform some logic functions; for example, a typical personal computer includes chips known as north bridge and south bridge chips. The computer 100 also includes a main memory 104. Control logic (software) and data are stored in the main memory 104 which may take the form of random access memory (RAM). The computer also includes a hardware graphics pipeline 106 and a display 108, i.e. a computer monitor.

The computer 100 may also include a secondary storage 110. The secondary storage 110 includes, for example, a hard disk drive and/or a removable storage drive, representing a floppy disk drive, a magnetic tape drive, a compact disk drive, etc. The removable storage drive reads from and/or writes to a removable storage unit in a well known manner. Computer programs, or computer control logic algorithms, are stored in the main memory 104 and/or the secondary storage 110. Such computer programs, when executed, enable the computer 100 to perform various functions. Memory 104 and storage 110 are thus examples of computer-readable media.

In one embodiment, the techniques to be set forth are performed by the hardware graphics pipeline 106 which may take the form of hardware. Such hardware implementation may include a microcontroller or any other type of custom or application specific integrated circuit (ASIC). In yet another embodiment, the method of the present invention may be carried out in part on the processor 101 by way of a computer program stored in the main memory 104 and/or the secondary storage 110 of the computer 100. One exemplary architecture for the hardware graphics pipeline 106 will be set forth during reference to FIG. 1B.

Prior Art FIG. 1B illustrates a more detailed diagram showing the internal structure of one exemplary embodiment of the hardware graphics pipeline 106 of FIG. 1A. As shown, a geometry stage 153 is provided which transforms primitives into a screen-aligned coordinate system. Other computations may be performed by the geometry stage 153 such as lighting to determine the visual properties (e.g., color, surface normal, texture coordinates) of each vertex describing the primitives. The transformed vertices form the input for a rasterizer 154. The rasterizer 154 computes a fragment for each pixel covered by each of the primitives. A coverage mask stored with the fragment indicates which portions of the pixel the fragment covers.

With continuing reference FIG. 1B, after optional multi-sampling, individual samples are sent to a raster-processor (ROP) 155 as if they were regular fragments. The raster-processor 155 performs various operations on the fragments, including z/stencil testing and color or alpha blending. This may require the raster-processor 155 to read a frame buffer memory 156 in order to retrieve the destination z-value or the destination color. To this end, the final pixel color and z-value are written back to the frame buffer memory 156.

When all primitives in the scene have been rendered in this manner, the contents of the frame buffer memory 156 are scanned out by a video refresh unit 157 and sent to the display 108.

Prior Art FIG. 1C illustrates an architecture for performing stencil and z-value functions in the context of the ROP 155 of Prior Art FIG. 1B. As shown, a stencil value function module 180 and a z-value function module 182 are provided for performing various operations involving stencil values and z-values, respectively.

Associated with the stencil value function module 180 is a stencil state register 184 for storing information relating to pertinent stencil functions, stencil operations, the stencil reference value(s), etc. In use, the stencil value function module 180 is adapted to receive a stencil value from the frame buffer memory 156 and the information from the stencil state register 184 for conditionally enabling a stencil value write to the frame buffer memory 156.

On the other hand, the z-value function module 182 is capable of receiving a z-value from the frame buffer memory 156 and a z-value associated with a particular pixel from the rasterizer 154. With these inputs, the z-value function module 182 is adapted to conditionally enable a z-value write to the frame buffer memory 156. In use, the output of the stencil value function module 180 and the z-value function module 182 may be combined with an AND function 186 for conditionally enabling a depth and color value write to the frame buffer memory 156.

One operation carried out by the foregoing architecture is "z-value buffering," whereby the z-values of the pixels are checked to ensure that the nearest object to the viewer is the one which is visible. To do this, each attempt to write to a pixel during rendering is checked against a stored frame buffer depth value in the existing data for that pixel, and the new data is written only if its depth value is less. In addition to these operations, there is a significant performance overhead associated with clearing the z-value buffer to infinity for each new frame. The impact of this operation can be substantial.

There are various techniques of utilizing the foregoing architecture and other various frameworks in order to reduce the number of depth clear operations in the hardware graphics pipeline 106.

In one prior art system, a depth range of [0,1] is split into two pieces, [0,0.5] and [0.5,1]. First, a frame is rendered into [0,0.5] in the normal fashion, but with the maximum z-value scaled to 0.5 instead of 1.0. Then, the z-value function module 182 is reversed to render into [0.5,1]. This provides the same results (in most cases) as if one had cleared the z-value buffer to a maximum value. While this technique gets rid of all z-value clears and no hardware support is required, 1 bit of z-value precision is lost and it does not work for all applications (i.e. only those that touch every pixel of the z-value buffer every frame).

In a variant to the foregoing system, a depth range of [0,1] is split into N ranges: [0,1/N], [1/N,2/N], ..., [(N−1)/N,1], and rendered into the farthest range. Every time an application clears the z-value buffer to the maximum value, it moves down one range. A clear operation may be performed when one needs to wrap. While this technique reduces the number of clears by factor of N, works for all applications, and requires no hardware support; it unfortunately loses log2(N) bits of z-value precision, which becomes prohibitively large. Further, the present technique does not work exactly right if an EQUAL or NOTEQUAL comparison function is used.

Still yet another prior art solution for reducing depth clears involves tag clears. Such method keeps a buffer on-chip that indicates what pixels in the z-value buffer have been cleared. One can use 1 bit per pixel if desired, but one can also get by with 1 bit per tile (where a tile can be whatever size desired). Having a bit set for a tile would mean, "all z-values in this tile equal 1.0" in a simple implementation. The present technique offers numerous advantages such as the fact that clears are almost free, it works for all applications, it works for color clears in some implementations, there is no loss in z-value precision, and reading the z-value of a cleared pixel is almost free in terms of resource usage. Unfortunately, however, die area for synchronous random access memory is needed, requiring a moderate amount of design effort and silicon area increase.

With z-value compression, clears may run fast because the buffer is compressed. Using compression techniques such as this can make a system run faster and can be combined with the foregoing techniques. Unfortunately, tag random access memory (RAM) is expensive and very complicated in design, costing many gates in chip design.

DISCLOSURE OF THE INVENTION

A system and method are provided for reducing the number of depth clear operations in a hardware graphics pipeline. Initially, a frame count is stored into a frame buffer associated with the hardware graphics pipeline. The stored frame count is associated with a pixel. A depth clear operation is then performed based at least in part on the frame count utilizing the hardware graphics pipeline.

In one embodiment, the frame count may be stored in a stencil state register associated with a stencil value function module. The frame count may also be stored in a frame count register. Further, the frame count register may be separate from the stencil state register associated with the stencil value function module.

In another embodiment, a pixel frame count may be stored in a stencil value in the frame buffer. Still yet, the pixel frame count may be stored in a stencil value for each pixel written into a surface. Moreover, the storage of the stencil value may be conditional upon on a mode bit.

In still another embodiment, a z-value to be cleared by the depth clear operation may be stored in a clear register. Further, either the z-value of the clear register or a z-value of a frame buffer may be selectively inputted to a z-value function module for conditionally executing the depth clear operation. Further, whether the z-value of the clear register or the z-value of the frame buffer is inputted to the z-value function module may be controlled based on a comparison involving the frame count and the pixel frame count represented by the stencil value received from the frame buffer.

In still yet another embodiment, the frame count may be conditionally written to a frame buffer utilizing a stencil value function module in the hardware graphics pipeline based on a mode bit. The storing and the executing may be performed for a plurality of portions of a surface on a "region-by-region" basis.

An associated system and method are provided for reducing the number of depth clear operations in a hardware graphics pipeline. Initially, it is determined whether a hardware graphics pipeline is operating in a first mode of operation or a second mode of operation. If the hardware graphics pipeline is operating in the first mode of operation, a frame count may be written to a frame buffer associated with the hardware graphics pipeline. On the hand, if the hardware graphics pipeline is operating in the second mode of operation, a conventional stencil value is written to the frame buffer associated with the hardware graphics pipeline.

An associated system is provided for reducing the number of depth clear operations in a hardware graphics pipeline. Included is a stencil value function module for writing a frame count in a frame buffer of a hardware graphics pipeline. Associated therewith is a z-value function module coupled to the stencil value function module for executing a depth clear operation based at least in part on the frame count utilizing the hardware graphics pipeline.

In one embodiment, a z-value to be cleared by the depth clear operation may be stored in a clear register. A multiplexer may be coupled to the clear register for selectively inputting either the z-value of the clear register or a z-value of the frame buffer to the z-value function module for conditionally executing the depth clear operation. As an option, the multiplexer may be controlled by a comparator for selectively inputting either the z-value of the clear register or the z-value of the frame buffer to the z-value function module.

In still another embodiment, the comparator controls the multiplexer based on the frame count and a pixel frame count represented by a stencil value received from the frame buffer. Moreover, the frame count may be conditionally stored utilizing the stencil value function module associated with the hardware graphics pipeline based on a mode bit.

These and other advantages of the present invention will become apparent upon reading the following detailed description and studying the various figures of the drawings.

BRIEF DESCRIPTION OF THE DRAWINGS

The foregoing and other aspects and advantages are better understood from the following detailed description of a preferred embodiment of the invention with reference to the drawings, in which.

Prior Art

Prior Art

Prior Art

DESCRIPTION OF THE PREFERRED EMBODIMENTS

Figure 1A:
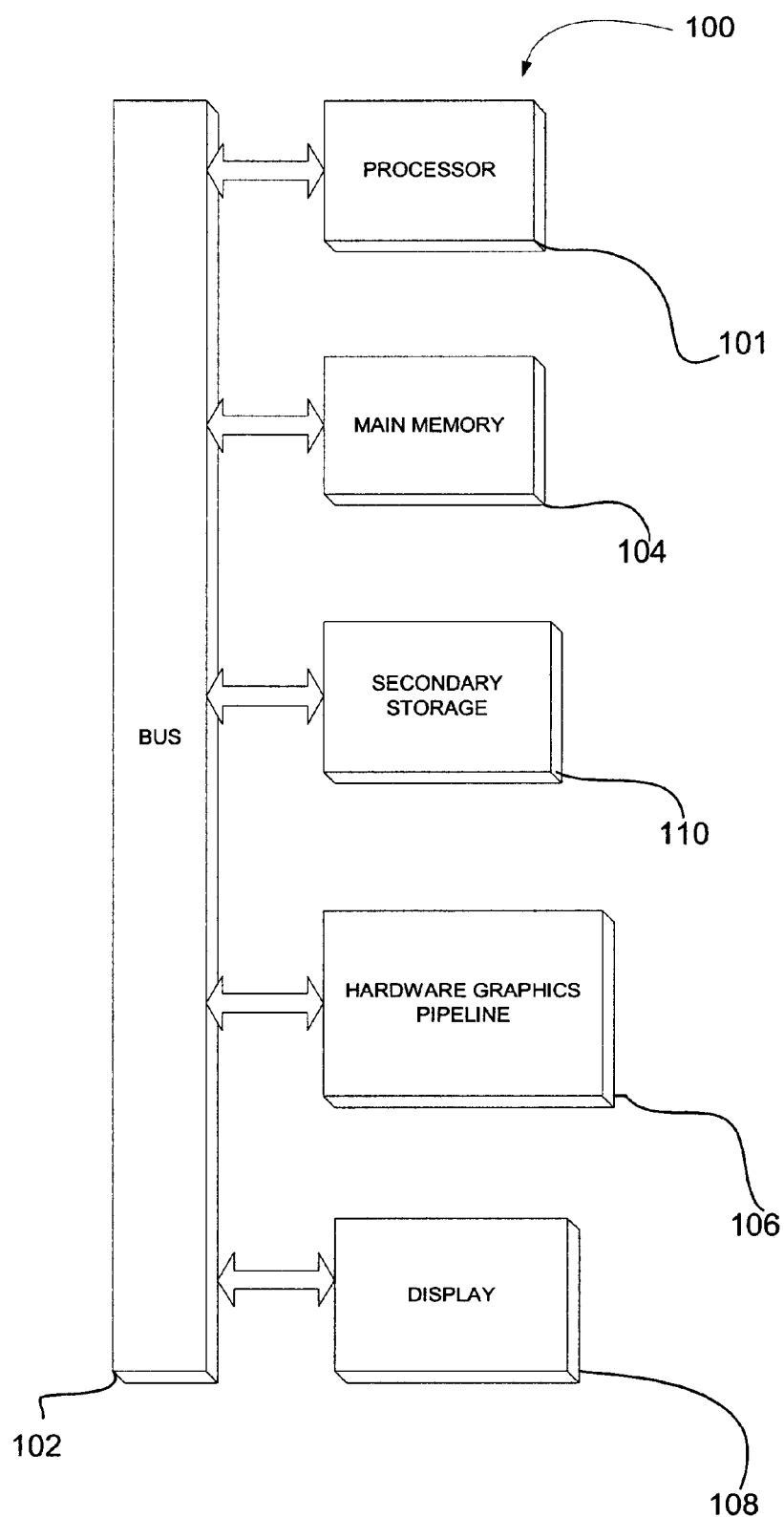
FIG. 1A is a block diagram of a digital processing system embodying a method and apparatus in accordance with one embodiment.
Figure 1B:
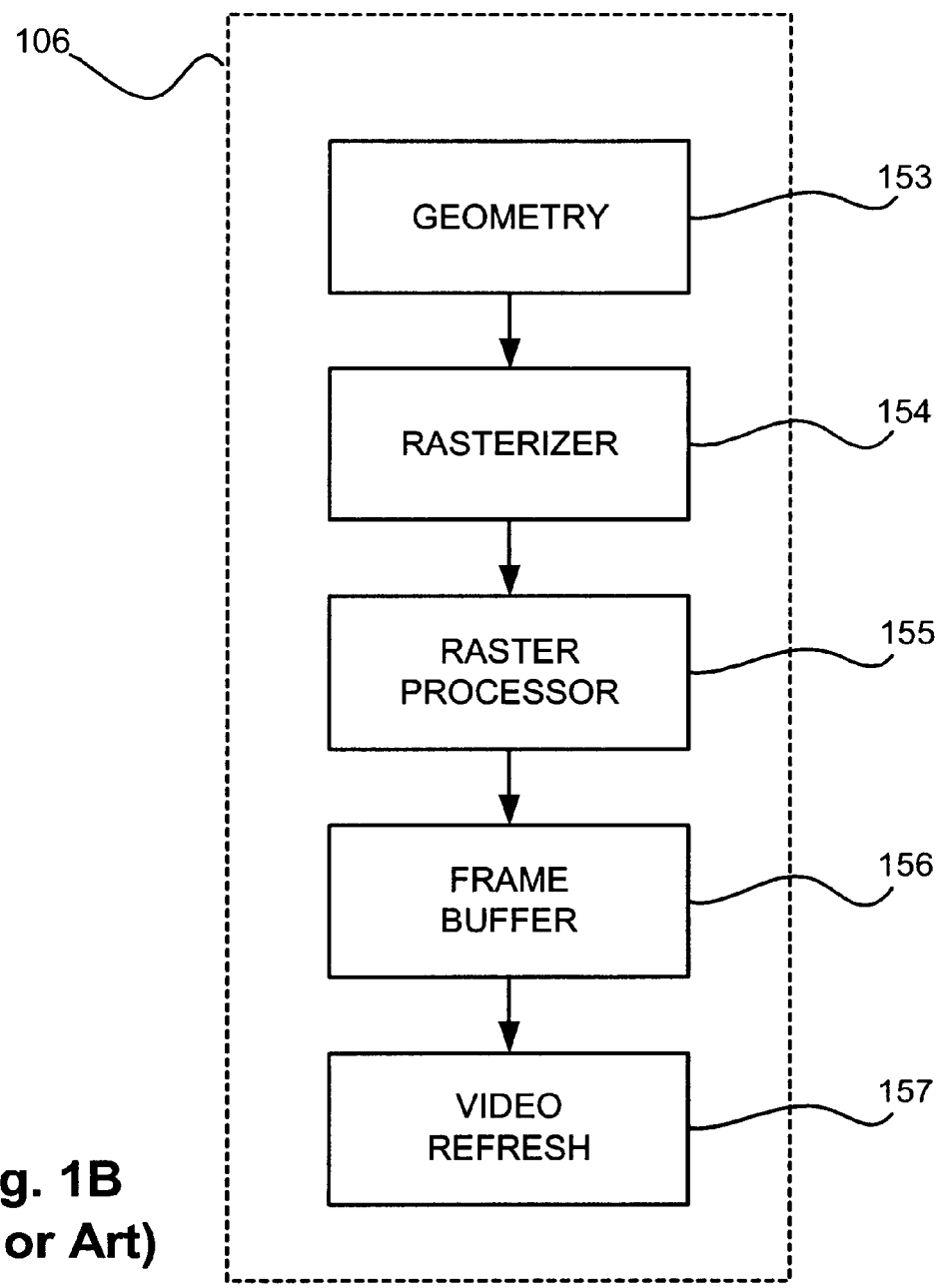
FIG. 1B illustrates the hardware graphics pipeline of FIG. 1A, in accordance with one embodiment.
Figure 1C:
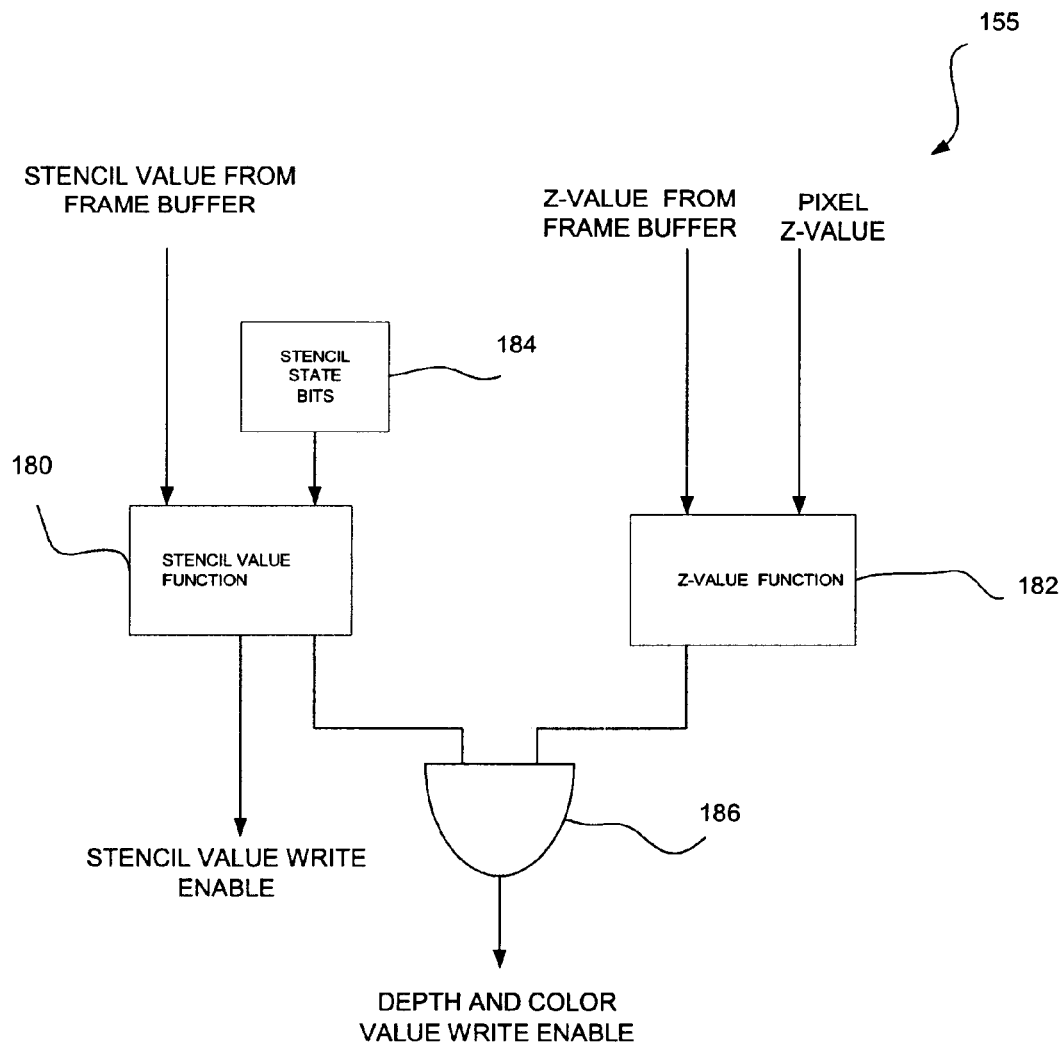
FIG. 1C illustrates an architecture for performing stencil and z-value functions in the context of the ROP of Prior Art FIG. 1B.
Figure 2:
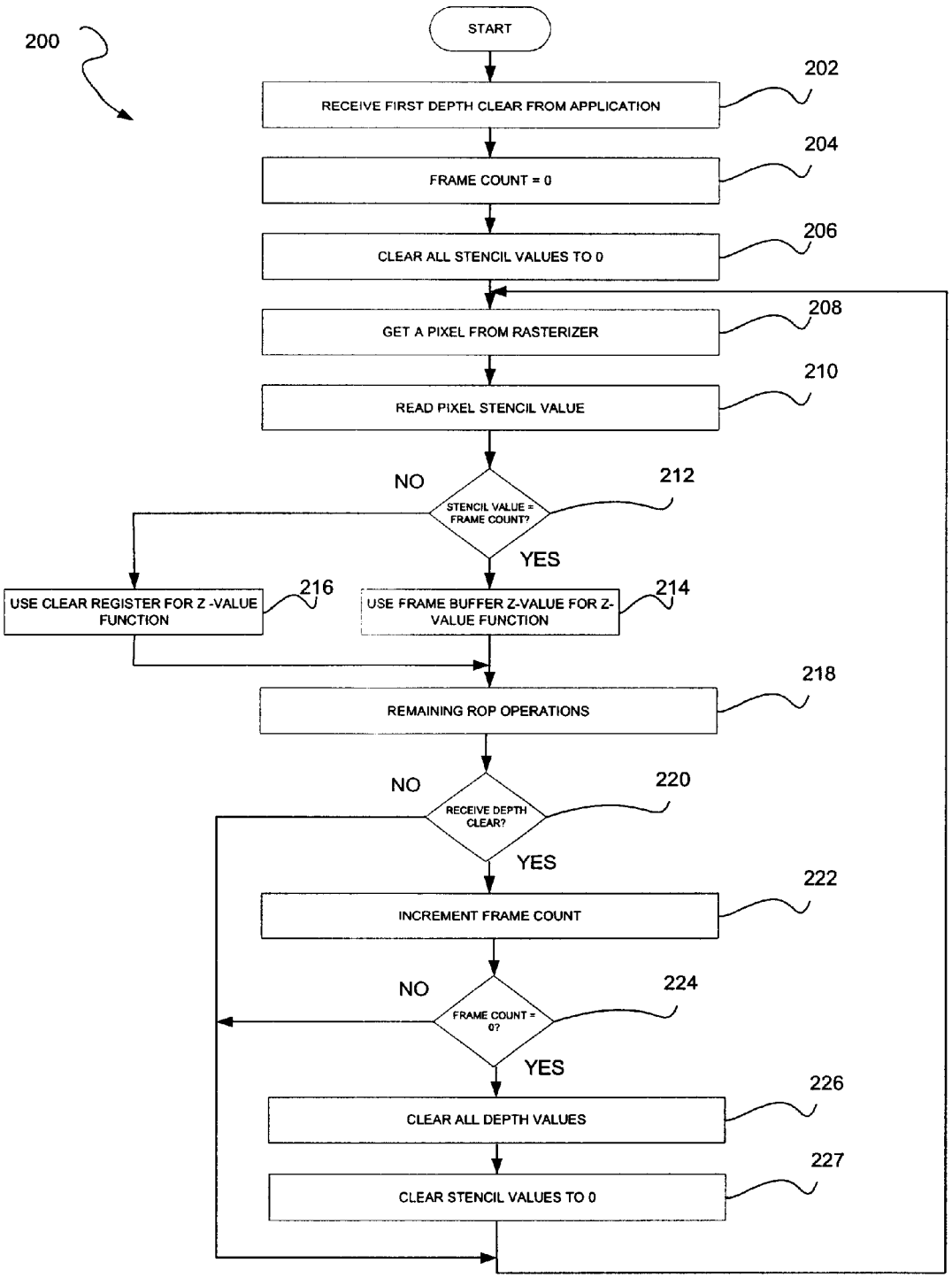
FIG. 2 illustrates a method for reducing the number of depth clear operations in a hardware graphics pipeline.

FIGS. 1A–C illustrate the prior arts FIG. 2 illustrates a method 200 for reducing the number of depth clear operations in a hardware graphics pipeline. In the context of the present description, such depth clear operations refer to any clearing or resetting of z-values in memory during graphics processing (i.e. z/stencil testing, color/alpha blending, or any other raster-processor operations, etc.). As mentioned earlier, there is a significant performance overhead associated with conventional depth clear operations.

The present method 200 improves graphics pipeline performance by reducing the number of such depth clear operations This is accomplished by performing a depth clear operation based at least in part on a frame count utilizing the hardware graphics pipeline.

In particular, after a graphics application is executed and a surface to be rendered is created, a first depth clear command may be received from the application in a well known manner. See operation 202. Next, a frame count of a frame count register is set to zero, in accordance with operation 204. A plurality of pixels is subsequently processed in the following manner.

Initially, a stencil state register is then set to zero in operation 206. As an option, all depth values may also be cleared in a frame buffer at this point. Next, a pixel is received from a rasterizer in operation 208, after which a stencil value associated with the pixel is read from a frame buffer in operation 210, in a well known manner. The frame buffer can correspond to an entire display screen, a window on a computer desktop, an off-screen surface, or any other memory to which rendering operations store values.

During the remaining operations, such stencil values serve as a pixel frame count identifying a frame associated with z-values currently involved in graphics processing (i.e. z/stencil testing, color/alpha blending, or any other raster-processor operations, etc.). Further, another frame count representing a present frame involved in the graphics processing is stored so that the pixel frame count (i.e. the frame count associated with the current z-value and represented by a stencil value) may be compared therewith to see if the incoming z-values correspond with a new frame. Based on this comparison, a z-value received from a clear register may be used to clear the frame buffer.

Specifically, it is determined whet her the pixel frame count represented by the stencil value equals the frame count of the frame count register. See decision 212. In the context of the present description, a frame count can be any parameter, value, data structure capable of tracking a graphics frame. If it is determined that the stencil value equals the frame count of the frame count register, a z-value function (i.e. a depth test or any other test or function involving depth values) is performed utilizing a z-value received from the frame buffer. Note operation 214. In other words, when operating on z-values of a current frame, the present method 200 operates in a conventional manner.

If, on the other hand, it is determined that the stencil value does not equal the frame count of the frame count register, it is assumed that the processing has moved to another frame. In the present method 200, however, the z-value function is performed utilizing a z-value received from a clear register in operation 216 to perform a depth clear operation. Such z-value may include a last clear value.

Any remaining conventional raster-processor (ROP) operations are then performed in operation 218. In the remaining ROP operations 218, if the depth value for a pixel is written to the frame buffer, the frame count is written to the stencil value for that pixel.

It is then determined whether a depth clear command has been received in decision 220. If is determined that the depth clear command has been received, the frame count of the frame count register is incremented indicating, as far as depth clears are concerned, that a new frame has begun. See operation 222.

Next, in decision 224, it is determined whether the frame count of the frame count register has overflowed. If a conventional up-counter is used, the frame count will roll over to zero upon overflow. If it is determined that the frame count of the frame count register equals zero, a depth clear operation is performed on all z-values in operation 226, a clear operation is performed on the stencil values in operation 227; these clears 226 and 227 being done to deal with wraparound issues resulting from the fact that the frame count register and framebuffer stencil storage have finite bit widths.

Figure 3A:
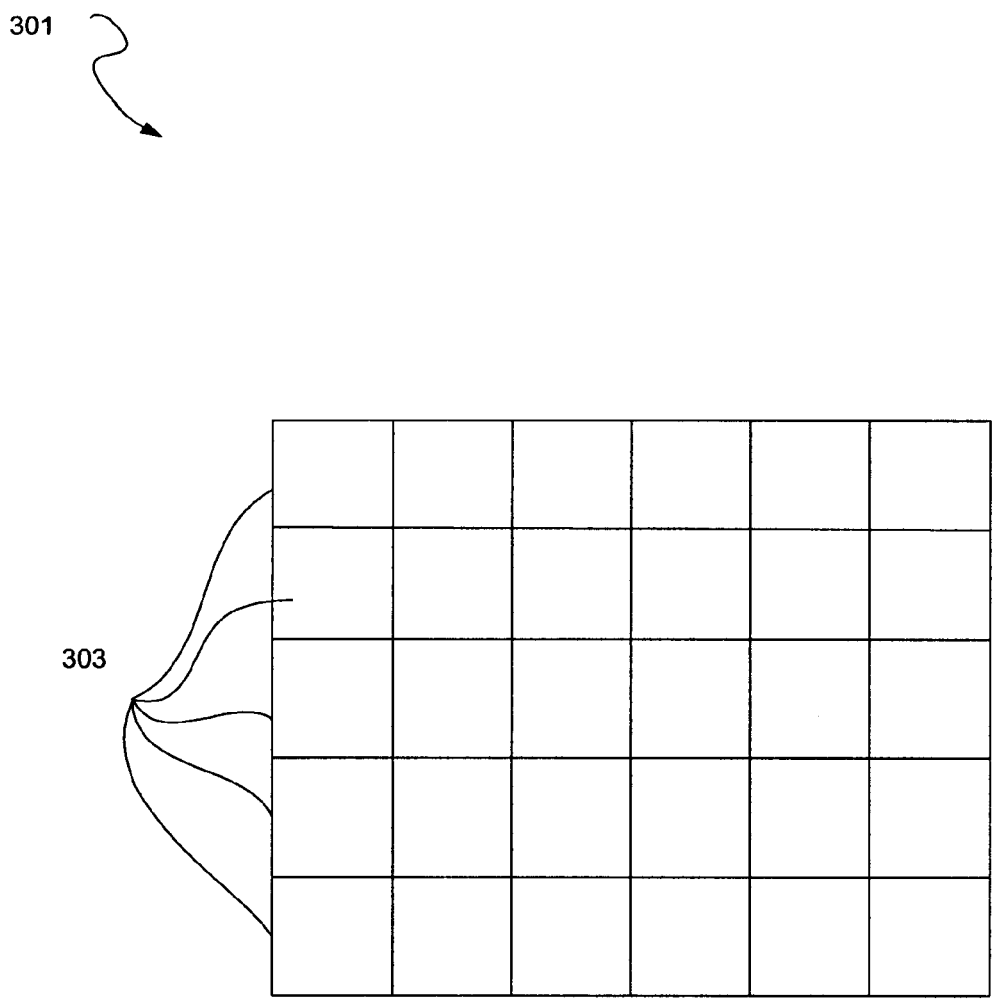
FIG. 3A illustrates the manner in which a frame buffer may be processed in the foregoing manner on a "region-by-region" basis.

FIG. 3A illustrates the manner in which a frame buffer 301 may be processed in the foregoing manner on a "region 303-by-region 303" basis. Each region 303 comprises a plurality of pixels. The objective of the region 303-by-region 303 basis is to distribute the clearing of the depth values (see operation 226 of FIG. 2) and clearing of stencil values (see operation 227 of FIG. 2) over all the frames, rather than concentrating the clears 226, 227 in one frame. The manner in which this is accomplished will be set forth in greater detail during reference to FIG. 3B.

Figure 3B:
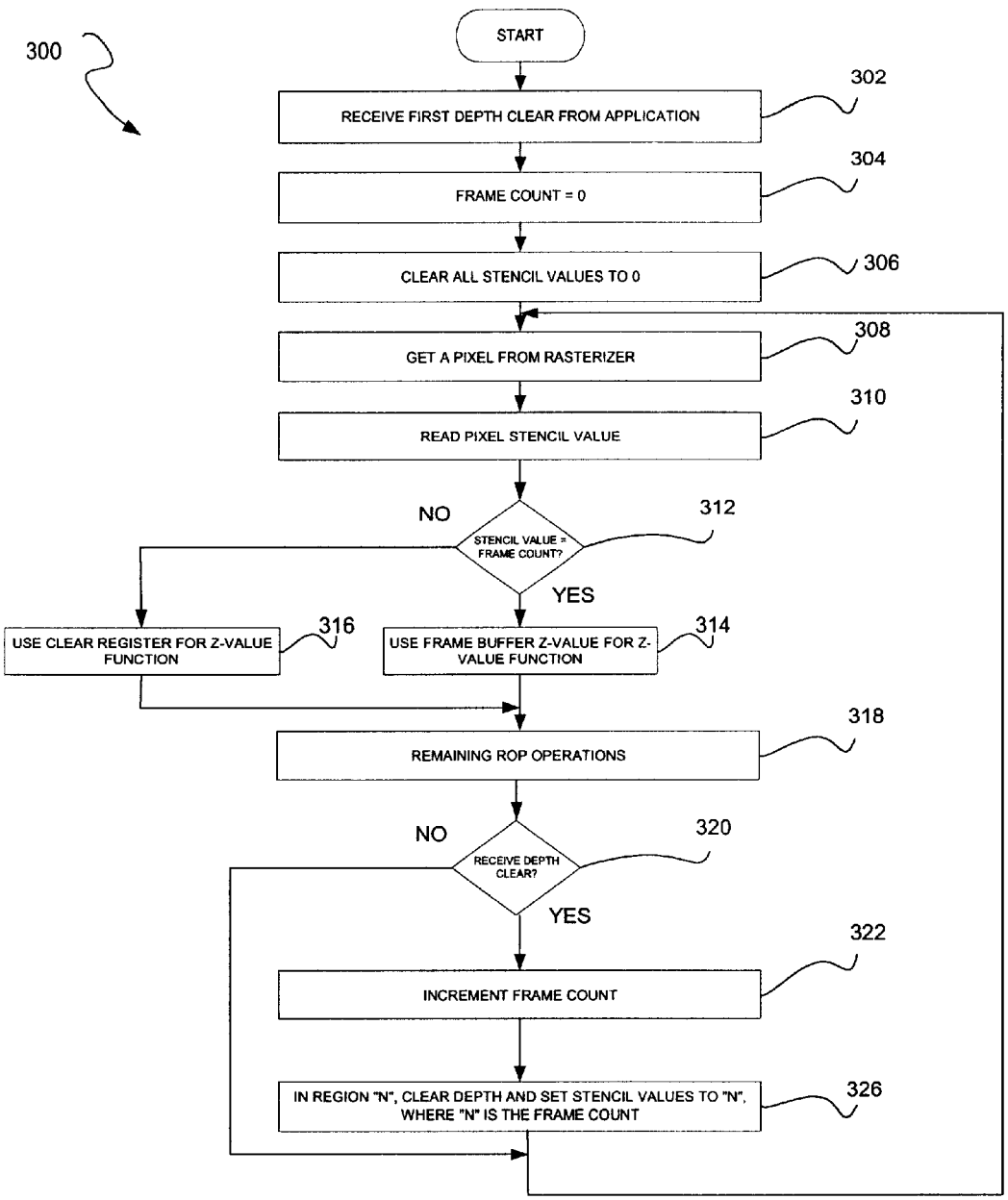
FIG. 3B illustrates a method for reducing the number of depth clear operations in a hardware graphics pipeline on a region-by-region basis.

FIG. 3B illustrates a method 300 for reducing the number of depth clear operations in a hardware graphics pipeline on a region-by-region basis. Such method 300 includes operations similar to those of FIG. 2, but modified for processing pixels in a region-by-region basis.

Initially, a first depth clear command is received from an application in a well known manner, causing all depth values in the frame buffer to be set to a clear value. See operation 302. A frame count of a frame count register is set to zero, in accordance with operation 304. All stencil values in the frame buffer are cleared in operation 306.

A plurality of pixels is then processed in the following manner. Initially, a stencil state register is set to zero in operation 306. Next, a pixel is received from a rasterizer in operation 308, after which a stencil value associated with the pixel is read in operation 310. It is then determined whether the stencil value equals the frame count of the frame count register. See decision 312. If it is determined that the stencil value equals the frame count of the frame count register, a z-value function is performed utilizing a z-value received from a frame buffer. Note operation 314. If, on the other hand, it is determined that the stencil value does not equal the frame count of the frame count register, the z-value function is performed utilizing a z-value received from a clear register in operation 316.

Any remaining convention raster-,processor (ROP) operations are then performed in operation 318. In the remaining ROP operations 318, if the depth value for a pixel is written to the frame buffer, the frame count is written to the stencil value for that pixel.

It is then determined whether a depth clear command has been received in decision 320. If is determined that the depth clear command has been received, the frame count of the frame count register is incremented. See operation 322. If N regions 303 are used, then the frame count rolls over to zero after the value N−1. Hence, for each depth clear received (see operation 320), one region of the frame buffer (1/N of the total) has its stencil values and depth values cleared in operation 326, distributing clears 326 over all frames. This achieves a load balancing effect amongst frames by distributing a portion of an otherwise costly operation over many frames. The regions 303 can be any shape, and need not be contiguous (i.e., regions can be interleaved between pixels).

Next, in operation 326, for a region "N," depth and stencil values are cleared to "N," where "N" is the frame count. The purpose of this operation is the same as the stencil clear in the non-region case—to deal with wraparound issues arising from finite-size stencil storage.

Figure 4:
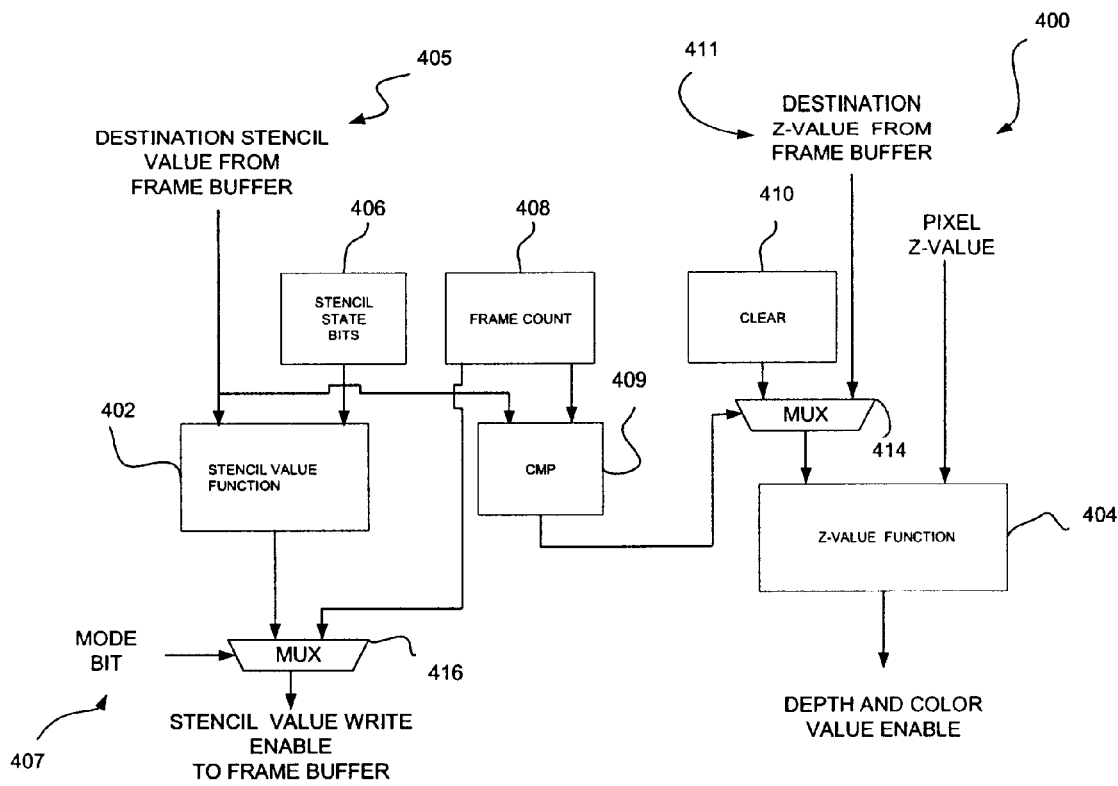
FIG. 4 illustrates an exemplary architecture with which the various methods of the present invention may be executed.

FIG. 4 illustrates an exemplary architecture 400 with which the foregoing methods may be executed. It should be noted any desired framework may be used to carry out the foregoing functionality. The present architecture 400 is thus set forth for illustrative purposes only, and should not be construed as limiting in any manner.

The present architecture 400 may include a rasterizer for providing a z-value associated with a pixel and a frame buffer for storing stencil values and z-values, as set forth in Prior Art FIGS. 1A–C. Also provided is a stencil state register 406 for storing a stencil state, a frame count register 408 for storing a frame count, and a clear register 410 for storing a z-value to be cleared. Of course, the frame count may be stored in the stencil state register 406 or any other memory.

Further included is a z-value function module 404, and a stencil value function module 402. The stencil value function module 402 is coupled to the stencil state register 406 and the frame count register 408. The stencil value function module 402 is adapted for performing a stencil value function (i.e. a stencil test or any other test or function involving stencil values) based on at least one of the stencil state of stencil state register 406 and the stencil values 405 of the frame buffer.

A first multiplexer 416 is coupled to the frame buffer, the frame count register 408, and the stencil value function module 402 for selectively writing either an output of the stencil value function module or the frame count to the frame buffer based on a mode bit 407. Such mode bit 407 may thus control whether the stencil value function module 402 of the present architecture 400 is being used to perform conventional stencil operations or reduce the number of depth clear operations. If the mode bit indicates reducing the number of depth clear operations, the multiplexer 416 selects the frame count 408 output so that other ROP operations 218, 318 can write the frame count value to the stencil bits in the frame buffer.

A second multiplexer 414 is coupled to the clear register 410, the frame buffer, and the rasterizer for selectively inputting either the z-value of the clear register 410 or the z-value 411 of the frame buffer to the z-value function module 404 for conditionally executing the depth clear operation.

Still yet, a comparator 409 is coupled to the frame buffer, frame count register 408, and the second multiplexer 414. In use, the comparator 409 is adapted for controlling whether the z-value of the clear register 410 or the z-value of the frame buffer is inputted to the z-value function module 404 based on a comparison involving the frame count of the frame count register 408 and the stencil value of the frame buffer. See operation operations 212–214 of FIG. 2.

In an alternate embodiment, a portion of the frame buffer can be dedicated to storing per-pixel frame count values, thereby allowing the use of the stencil bits for stencil operations, as known in the art.

Figure 5:
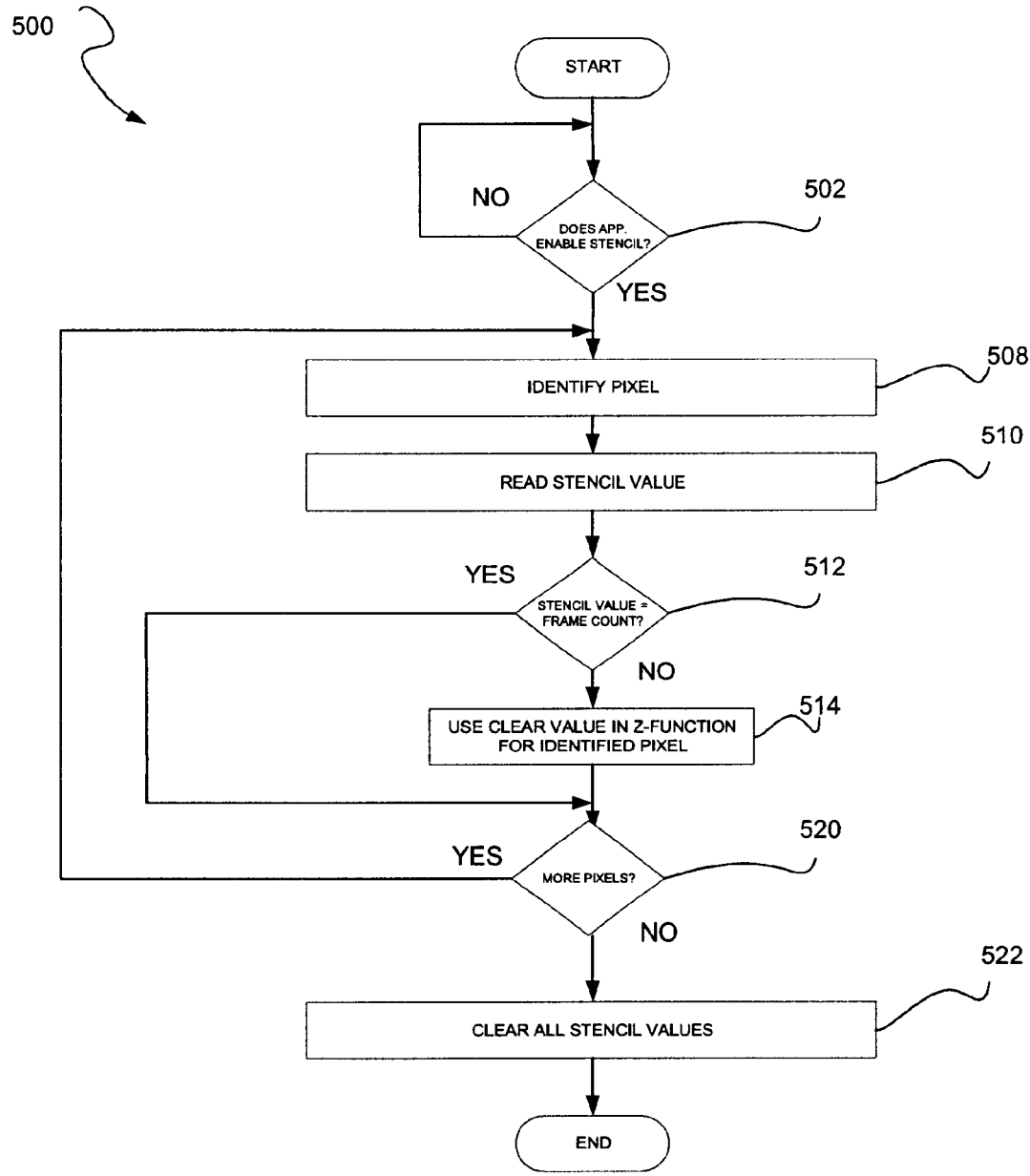
FIG. 5 illustrates another method for reducing the number of depth clear operations in a hardware graphics pipeline that may be implemented in the context of the architecture of FIG. 4.

FIG. 5 illustrates another method 500 used in reducing the number of depth clear operations in a hardware graphics pipeline that may be implemented in the context of the above-described methods land/or in the context of the architecture 400 of FIG. 4. Of course, the present method 500 may be implemented in any desired architecture, per the desires of the user. The present method 500 is capable of handling the situation where a stencil capability is enabled during rendering.

The method 500 is used for a circumstance where an application program turns on (i.e., enables) stencil operations after initially not using stencil. In this situation, the use of stencil bits must be changed from storing frame counts to use in stencil operations as known in the art. Depth clears are then done in the prior art manner because the stencil bits are used by stencil operations. It is first determined in decision 502 whether the current graphics application enables stencil processing. Only if such stencil processing is enabled is the current method 500 carried out. If this is the case, multiple pixels are processed in the following manner.

Once a pixel is identified in operation 508, a stencil value associated with the pixel is identified in operation 510. Next, in decision 512, it is determined whether the stencil value equals a frame count. In one embodiment, this may be carried out by a comparator 409 like that shown in FIG. 4.

If it is determined that the stencil value does not equal the frame count in decision 512, a z-value function is performed utilizing a z-value received from a clear register as an input to a z-value function module. It is then determined whether more pixels exist in decision 520. Thus, the foregoing operations are repeated for each of the pixels to be processed. After such processing, the stencil values are cleared in operation 522.

Figure 6:
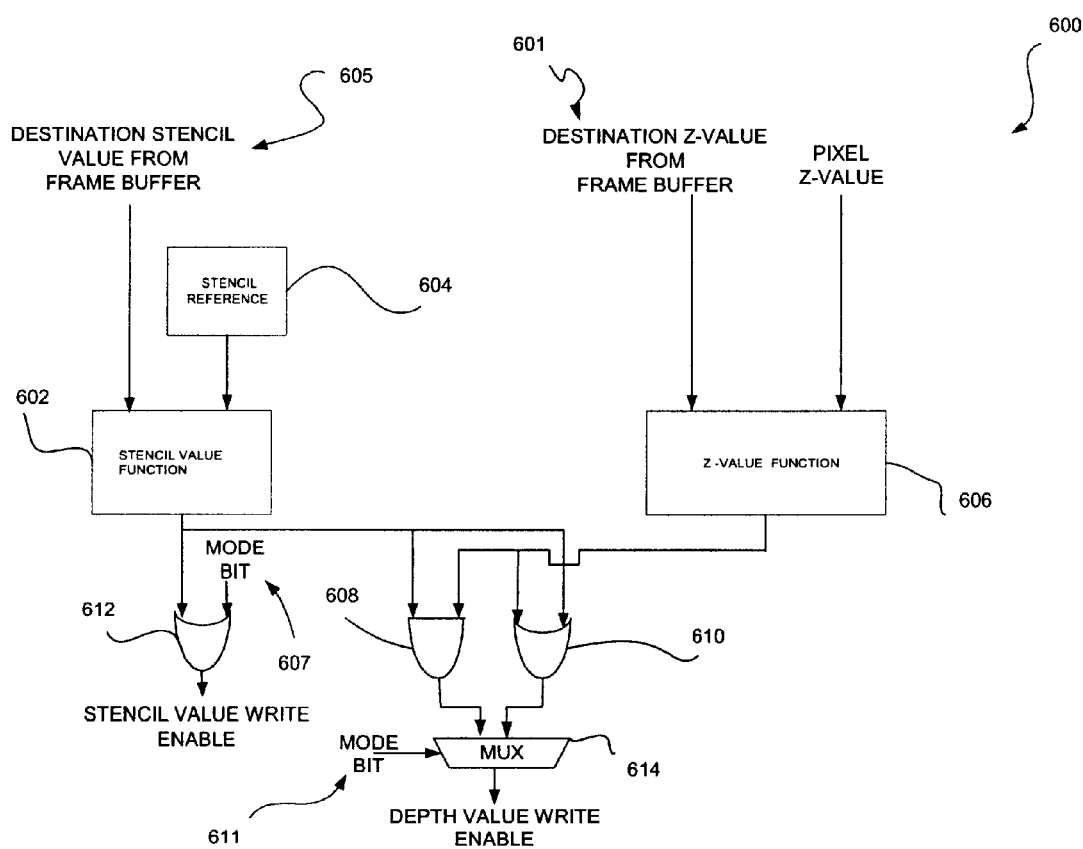
FIG. 6 illustrates another exemplary architecture with which the various foregoing methods may be executed.

FIG. 6 illustrates another exemplary architecture 600 with which the foregoing methods may be executed. It should be noted any desired framework may be used to carry out the foregoing functionality. The present architecture 600 is thus set forth for illustrative purposes only, and should not be construed as limiting in any manner.

While not represented by numerals, the present architecture 600 may include a rasterizer for providing a z-value associated with a pixel and a frame buffer for storing stencil values and z-values. Note Prior Art FIG. 1A–C.

Also provided is a stencil state register 604 for storing either a stencil state (as known in the art) or a fame count. Further included is a z-value function module 606, and a stencil value function module 1602. The stencil value function module 602 is coupled to the stencil state register 1604 for performing a stencil value function based on the stencil state of stencil state register 604 and the stencil values 605 of the frame buffer. The z-value function module 606 receives z-values from the frame buffer and the rasterizer for performing a z-value function thereon.

A first OR gate 612 includes an output coupled to the frame buffer, and inputs coupled to the stencil value function module 602 and a first mode bit 607 for writing the output of an OR function to the frame buffer based on an output of the stencil value function module 602 and the first mode bit 607.

A second OR gate 610 includes an output coupled to a multiplexer 614, and inputs coupled to the z-value function module 606 and the stencil value function module 602 for writing the output of an OR function based on an output of the stencil value function module 602 and the z-value function module 606. This output of the OR gate 610 is then selectively written to the frame buffer via the multiplexer 614 based on a second mode bit 611.

An AND gate 608 includes an output coupled to the multiplexer 614 and inputs coupled to the z-value function module 606 and the stencil value function module 602 for writing the output of an AND function based on an output of the stencil value function module 302 and the z-value function module 606. This output of the AND gate 308 is then selectively written to the frame buffer via the multiplexer 614 based on the second mode bit 611.

Thus, if a stencil test associated with the stencil value function module 602 fails, it means that the pixel has been written on this frame. It should be noted that the only way the stencil value 605 may match the stencil state value of the stencil state register 604 is if it has been already written on the current frame. The pixel is killed based on an ordinary z-value buffer test involving the z-value function module 606, since the stored z-value 601 is valid to test against. It should be noted that one can set the stencil value function module 602 to "keep," since the frame buffer already contains the stencil state value of the stencil state register 604.

If the stencil test of the stencil value function module 602 passes, however, the pixel is written, regardless of the z-value test involving the z-value function module 606. This implies that the stored z-value 601 is out-of-date, since it came from a previous frame. Because the pixel has not been touched yet on this frame, the z-value is treated as if it had already bee n cleared, implying that the pixel is always written, even if the z-value test fails. It should be noted that the stencil value function module 602 is set to "replace," to indicate that the pixel was touched on the current frame.

One challenge in preventing the foregoing technique from working on ordinary hardware involves an issue, whereby a pixel traveling down the pipeline will be killed if either the stencil test or the z-value test fails. As mentioned hereinabove, if the stencil test passes, the pixel is to be written, even if the z-value test fails. It is also desired that the pixel be written if the z-value test passes, even if the stencil test fails. Thus, it is desired to be able to set the hardware to kill the pixel only if both the z-value test and the stencil test fail. This may be accomplished using one bit of a control register to select between the two modes, and a few extra gates to provide an alternate calculation.

Wraparound may also be dealt with appropriately by performing a clear every predetermined number (i.e. N=255) of frames. Both a z-value and stencil clear may also be performed. For example, a z-value clear may be made to infinity, and a stencil clear to a predetermined number just before frame 0.

The stencil values in the frame buffer thus allow the scheme to work until a predetermined frame is reached because the stencil test against pixels with a value of such number will always pass (remember that the function is "not equal"). It becomes trickier on frame N since there may be pixels that haven't been touched in prior frames, and hence still have a stencil value of N. The stencil test assumes that this condition can only occur if the pixels in this frame have been touched, and this clearly has not occurred yet. However, because a real z-value clear has been performed, all the pixels that still have a stencil of value N are also cleared to infinity, meaning that the ordinary z-value test (which happens when the stencil test fails) can occur normally.

Table 1 summarizes various steps to implement the algorithm in a driver.

TABLE 1

1) Set up the stencil render states
2) Set the hardware such that it kills pixels when the Z test and the stencil test fails
3) Perform a Z clear to infinity and a stencil clear to 255 just before frame 0 (modulo 256), every 256 frames.

While various embodiments have been described above, it should be understood that they have been presented by way of example only, and not limitation. Thus, the breadth and scope of a preferred embodiment should not be limited by any of the above described exemplary embodiments, but should be defined only in accordance with the following claims and their equivalents. The order of elements within claims does not indicate any particular order of steps or operations.

What is claimed is:

1. A method for reducing the number of depth clear operations in a hardware graphics pipeline, comprising:
   storing a frame count into a frame buffer associated with the hardware graphics pipeline, the stored frame count associated with a pixel; and
   executing depth operations based at least in part on a comparison involving the frame count and stencil information utilizing the hardware graphics pipeline for reducing the number of depth clear operations in the hardware graphics pipeline.

2. The method as set forth in claim 1, wherein the frame count is stored as a stencil value in a stencil state register associated with a stencil value function module.

3. The method as set forth in claim 2, wherein the storing of the stencil value is conditional upon on a mode bit.

4. The method as set forth in claim 1, wherein a pixel frame count is stored in a stencil value in the frame buffer.

5. The method as, set forth in claim 1, wherein a pixel frame count is stored in a stencil value for each pixel written into a surface.

6. The method as: set forth in claim 1, wherein the frame count is stored in a frame count register.

7. The method as set forth in claim 6, wherein the frame count register is separate from a stencil state register associated with a stencil value function module.

8. The method as set forth in claim 1, and further comprising storing a z-value from a received depth clear operation in a clear register.

9. The method as set forth in claim 8, and further comprising selectively inputting either the z-value of the clear register or a z-value of a frame buffer to a z-value function module.

10. The method as set forth in claim 9, and further comprising controlling whether the z-value of the clear register or the z-value of the frame buffer is inputted to the z-value function module based on a comparison involving the frame count and a stencil value received from the frame buffer.

11. The method as set forth in claim 1, wherein the frame count is conditionally written to the frame buffer based on a mode bit.

12. The method as set forth in claim 1, wherein the storing and the executing are performed for a plurality of portions of the frame buffer.

13. A system for reducing the number of depth clear operations in a hardware graphics pipeline, comprising:
   a first module for writing a frame count into a frame buffer associated with the hardware graphics pipeline, the written frame count being associated with a pixel; and
   a z-value function module for executing depth operations based at least in part on a comparison involving the frame count and stencil information utilizing the hardware graphics pipeline for reducing the number of depth clear operations in the hardware graphics pipeline.

14. The system as set forth in claim 13, wherein the frame count is stored in a stencil state register associated with a stencil value function module.

15. The system as set forth in claim 14, wherein the frame count is stored in a frame count register.

16. The system as set forth in claim 15, wherein the frame count register is separate from a stencil state register associated with the stencil value function module.

17. The system as set forth in claim 13, wherein a z-value associated with a depth clear operation is stored in a clear register.

18. The system as sot forth in claim 17, wherein a multiplexer is coupled to the clear register for selectively inputting either the z-value of the clear register or a z-value of the frame buffer to the z-value function module.

19. The system as set forth in claim 18, wherein the multiplexer is controlled by a comparison function.

20. The system as set forth in claim 19, wherein the comparison function controls the multiplexer based on the frame count and a stencil value received from the frame buffer.

21. The system as set forth in claim 13, wherein the frame count is conditionally written into the frame buffer based on a mode bit.

22. The system as set forth in claim 13, wherein the storing and the executing are performed for a plurality of portions of the frame buffer.

23. A system for reducing the number of depth clear operations in a hardware graphics pipeline, comprising:
   stencil means for storing a frame count in the hardware graphics pipeline; and
   means for executing depth operations based at least in part on a comparison involving the frame count and stencil information utilizing the hardware graphics pipeline for reducing the number of depth clear operations in the hardware graphics pipeline.

24. A system for reducing the number of depth clear operations in a hardware graphics pipeline, comprising:
   stencil logic for storing a frame count in the hardware graphics pipeline; and
   logic for executing depth operations based at least in part on a comparison involving the frame count and stencil information utilizing the hardware graphics pipeline for reducing the number of depth clear operations in the hardware graphics pipeline.

25. A method for reducing the number of depth clear operations in a hardware graphics pipeline, comprising:
   determining whether the hardware graphics pipeline is operating in a first mode of operation or a second mode of operation;
   if the hardware graphics pipeline is operating in the first mode of operation, writing a frame count to a frame buffer associated with the hardware graphics pipeline; and
   if the hardware graphics pipeline is operating in the second mode of operation, writing a stencil value to the frame buffer.

26. A method for reducing the number of depth clear operations in a hardware graphics pipeline, comprising:
   receiving a first depth clear command from an application;
   setting a frame count of a frame count register to an initial value;
   processing each of a plurality of pixels by:
      identifying a stencil value associated with the pixel;
      determining whether the stencil value equals the frame count of the frame count register;
      if it is determined that the stencil value equals the frame count of the frame count register, performing a z-value function utilizing a z-value received from a frame buffer;
      if it is determined that the stencil value does not equal the frame count of the frame count register, performing the z-value function utilizing a z-value received from a clear register;
   determining whether a depth clear command has been received;
   if it is determined that the depth clear command has been received, incrementing the frame count of the frame count register;
   determining whether the frame count of the frame count register equals zero; and
   if it is determined that the frame count of the frame count-register equals zero, performing the depth clear operation.

27. A method for reducing the number of depth clear operations in a hardware graphics pipeline, comprising:
   processing each of a plurality of pixels by:
      identifying a stencil value associated with the pixel,
      determining whether the stencil value equals a frame count, and
      if it is determined that the stencil value does not equal the frame count, performing a z-value function utilizing a z-value received from a clear register.

28. A method for reducing the number of depth clear operations in a hardware graphics pipeline, comprising:
   storing a frame count utilizing a stencil value function module in the hardware graphics pipeline; and
   executing a region-by-region depth clear operation based at least in part on the frame count utilizing the hardware graphics pipeline.

29. A system for reducing the number of depth clear operations in a hardware graphics pipeline, comprising:
   a rasterizer for providing a z-value associated with a pixel;
   a frame buffer for storing stencil values and z-values;
   a stencil state register for storing a stencil state;
   a frame count register for storing a frame count;
   a clear register for storing a z-value to be cleared;
   a z-value function module;
   a stencil value function module coupled to the stencil state register and the frame count register, the stencil value function module adapted for performing a stencil value function based on the stencil state of stencil state register and the stencil values of the frame buffer;
   a first multiplexer coupled to the frame buffer, the frame count register, and the stencil value function module for selectively writing either an output of the stencil value function module or the frame count to the frame buffer based on a mode bit;
   a second multiplexer coupled to the clear register, the frame buffer, and the rasterizer for selectively inputting either the z-value of the clear register or the z-value of the frame buffer to the z-value function module for conditionally executing the depth clear operation; and
   a comparator coupled to the frame buffer, frame count register, and the second multiplexer, the comparator adapted for controlling whether the z-value of the clear register or the z-value of the frame buffer is inputted to the z-value function module based on a comparison involving the frame count of the frame count register and the stencil value of the frame buffer.

* * * * *

UNITED STATES PATENT AND TRADEMARK OFFICE
CERTIFICATE OF CORRECTION

PATENT NO. : 6,812,927 B1  Page 1 of 1
APPLICATION NO. : 10/175199
DATED : November 2, 2004
INVENTOR(S) : Cutler et al.

It is certified that error appears in the above-identified patent and that said Letters Patent is hereby corrected as shown below:

Claim 5, col. 10, line 36; replace "as, set" with --as set--;
Claim 6, col. 10, line 39; replace "as: set" with --as set--;
Claim 18, col. 11, line 14; replace "sot" with --set--.

Signed and Sealed this

Thirteenth Day of March, 2012

David J. Kappos
*Director of the United States Patent and Trademark Office*